United States Patent

[11] 3,614,175

[72] Inventor Thomas G. Lawson
       Tyseley, Birmingham, England
[21] Appl. No. 800,092
[22] Filed Feb. 18, 1969
[45] Patented Oct. 19, 1971
[73] Assignee Girling Limited
       Tyseley, Birmingham, England
[32] Priority Feb. 21, 1968
[33] Great Britain
[31] 8491/68

[54] VEHICLE BRAKING SYSTEMS
     4 Claims, 10 Drawing Figs.
[52] U.S. Cl. .................................................. 303/22 R, 188/195
[51] Int. Cl. .................................................. B60t 8/18
[50] Field of Search .......................................... 303/22, 22 A, 6, 6 C; 188/152, 152.11, 195

[56] References Cited
         UNITED STATES PATENTS
| | | | |
|---|---|---|---|
| 2,242,856 | 5/1941 | Flowers | 303/22 |
| 2,270,366 | 1/1942 | Wolf | 303/22 |
| 2,824,769 | 2/1958 | Thomas | 303/22 |
| 2,940,796 | 6/1960 | Ortmann et al. | 303/22 A |
| 2,950,147 | 8/1960 | Nevbeck | 303/22 A |

*Primary Examiner*—Milton Buchler
*Assistant Examiner*—John J. McLaughlin
*Attorney*—Scrivener, Parker, Scrivener and Clarke

ABSTRACT: The invention relates to pressure control arrangements for hydraulic brake systems on vehicles having a independent suspension for the front and/or rear wheels. The invention resides in an arrangement in which a pressure control valve (which may be an intensifying, reducing or pressure-limiting valve) and a control linkage for transmitting a force corresponding to vehicle loading to the valve for altering the cutoff pressure thereof, wherein the valve is loaded by separate spring means coupled to respective independently sprung wheel assemblies on opposite sides of the vehicle, the loadings imposed by the respective springs being additive in their control effect upon the valve. Thus, the linkage serves to average out the effects of different deflections of the sprung wheel masses on opposite sides of the vehicle and at the same time avoids the expense and characteristic difficulties involved in having two separate control valves controlled by deflections on the respective sprung wheel assemblies to which they are subject.

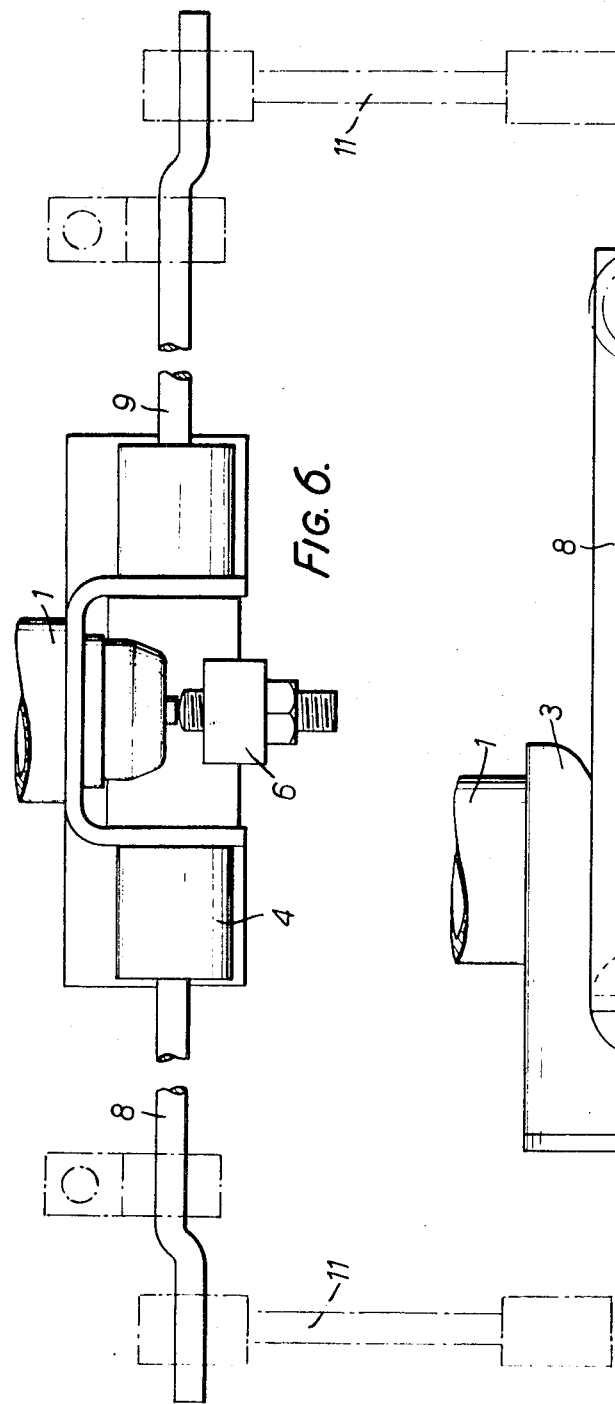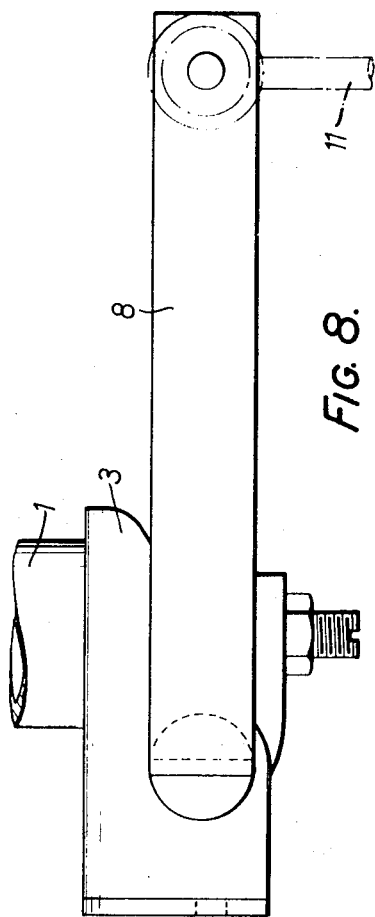

VEHICLE BRAKING SYSTEMS

In modern hydraulic breaking systems for motor vehicles, it is known to provide a brake pressure control valve which serves to reduce, limit or increase hydraulic pressure at one set of wheel brakes relative to another, the usual purpose being to ensure that, at least above a threshold or "cutoff" pressure, the pressure developed at the rear brakes is less than that at the front brakes, to take account of the weight transfer which takes place on braking and thereby reduce the danger of the rear wheels locking and skidding.

The present invention relates to hydraulic braking systems of this character, in which the cutoff pressure is dependent upon the vehicle load measured in terms of vertical deflection of the sprung vehicle mass relative to the unsprung mass at either the front or the rear wheels of the vehicle.

In the case of a vehicle having a solid back axle assembly this is readily achieved by means of a single control valve arranged to sense deflections (relative to the spring vehicle mass) at the center of the back axle. However, the present invention is applicable to a vehicle having an independent suspension (either of the front or rear wheels). Braking systems are known in which deflections of independently sprung wheel assemblies are applied to separate control valves, each controlling the braking pressure on one side of the vehicle, but these have the disadvantages firstly of extra cost and secondly that it is very difficult to match the control valves so as to ensure equal braking effect on both sides of the vehicle under conditions of equal wheel deflection.

In accordance with the present invention, however, there is provided in or for a motor vehicle having an independent suspension at the front or rear wheels, an hydraulic brake pressure control installation including a single brake pressure control valve and a control linkage for determining the cutoff pressure of the valve, wherein the control linkage comprises control spring means, opposite ends of which are adapted for attachment to independently sprung wheel assemblies on opposite sides of the vehicle.

With such an arrangement, deflections of the independently sprung wheel assemblies are effectively averaged out, and the spring force applied to the control valve corresponds to the average deflection of the sprung wheel assemblies.

The control valve may be mounted substantially centrally of the two rear wheels (or the two front wheels), and the control spring means may extend symmetrically to either wheel assembly. Alternatively, the control valve may be sited to one side of the vehicle, and the control spring means comprise asymmetrical portions for attachment to the respective wheel assemblies.

Some embodiments of the invention will now be described in detail, by way of example only, with reference to the accompanying drawings, in which:

FIGS. 5, 6 and 7 are views, corresponding to FIGS. 1 to 3 of a second form of installation;

FIGS. 8 and 9 are views, corresponding to FIGS. 1 and 3 of a third form of installation.

In the drawings, corresponding parts of the different embodiments are identified by the same reference numerals.

Figure 1:
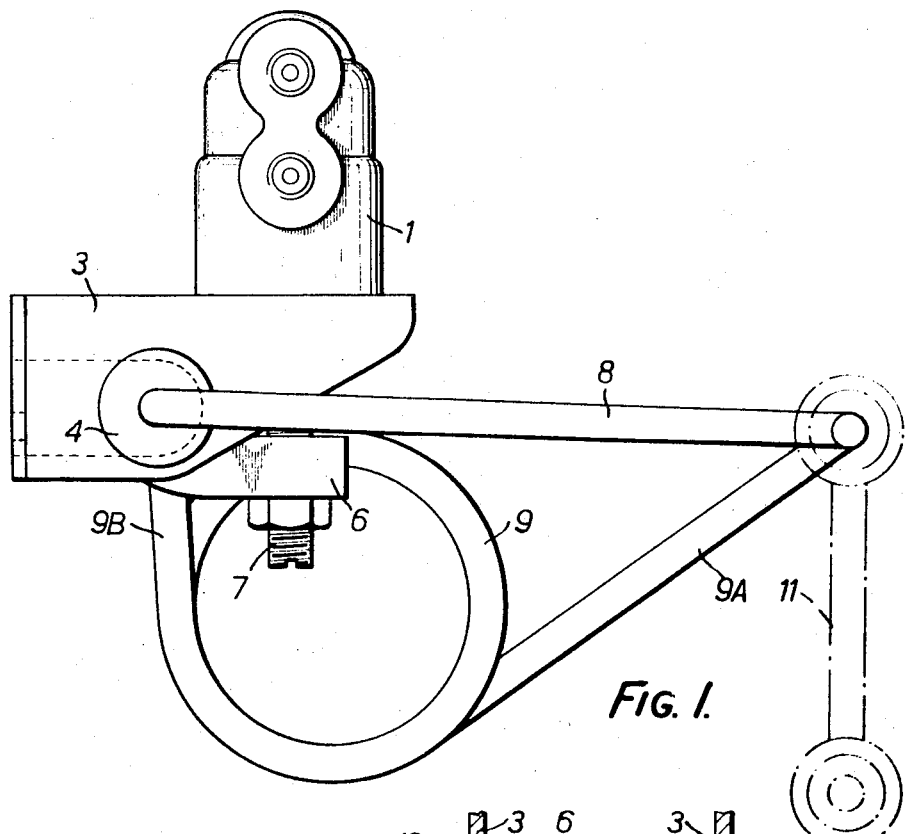
FIGS. 1 and 2 are an end and side elevation, respectively, of coupling, form of control valve installation.

In each of the embodiments, there is a brake pressure control valve 1 having a movable valve member with a projecting end 2. The valve is securely mounted on a support bracket 3 in which is journaled a coupling member 4, forming part of a control linkage. An operating lever 6 is mounted on the coupling member 4 and keyed to it for rotation therewith in a manner to be described in more detail below. The free end of the lever 6 acts upon the end 2 of the valve member through a screw-threaded adjustable abutment 7. Keyed to the coupling member are the adjacent inner ends of two control springs 8 and 9, whose outer ends are coupled to pivoted links 11 by means of which the springs are adapted to be attached to independently sprung wheel assemblies on opposite sides of the vehicle. The links 11 may, for example, be connected in use to the respective trailing arms of an independent rear suspension.

In each case, the arrangement is such that the spring loading applied to the movable valve member is dependent upon the load upon and corresponding deflection of the wheel assemblies with respect to the sprung mass of the vehicle (the control valve being mounted in use upon the sprung mass).

Figure 3:
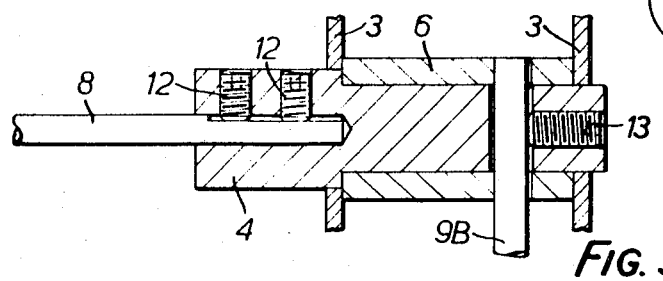
FIGS. 3 and 4 are sectional elevations of two alternative forms of coupling.
Figure 2:
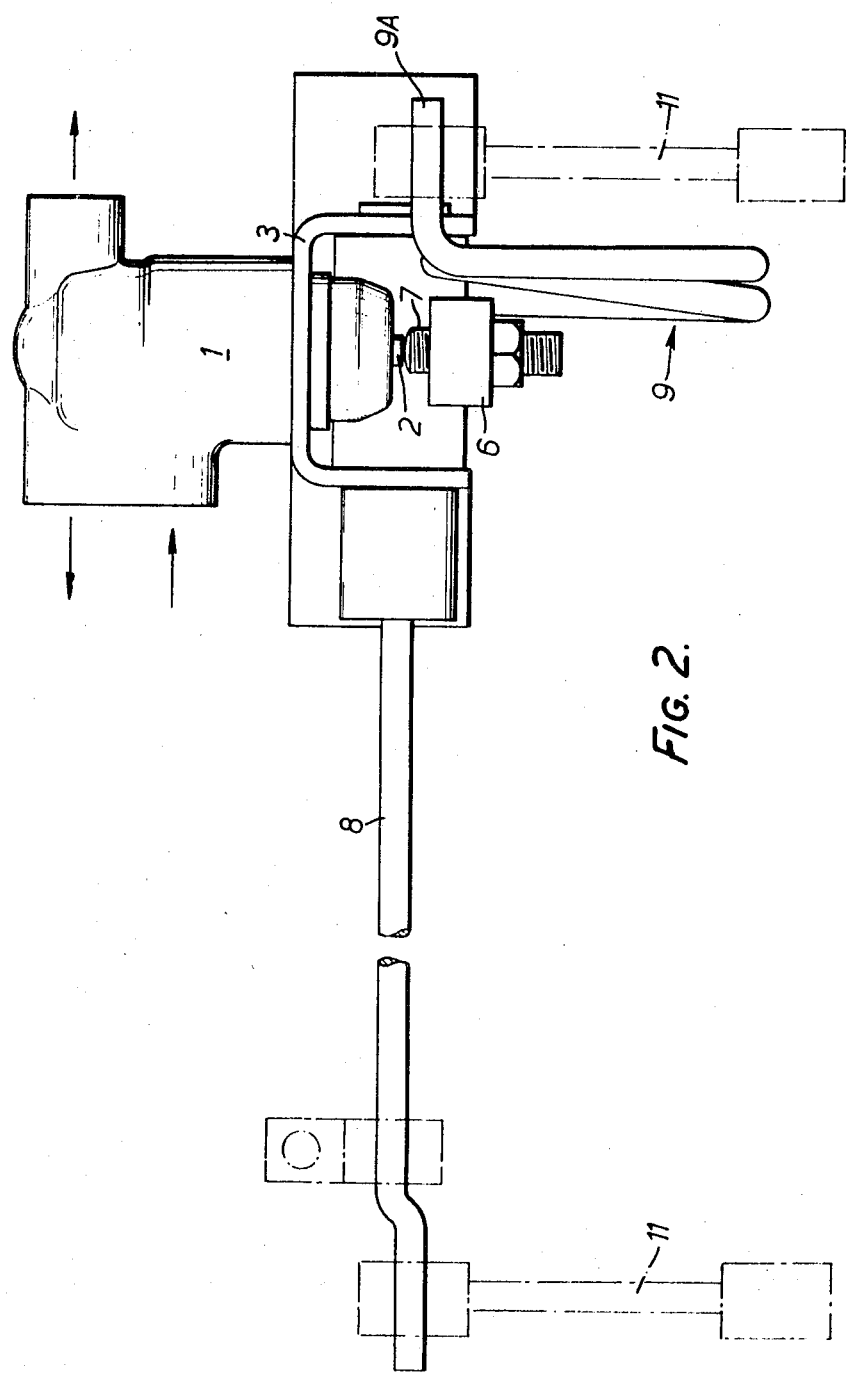

In the installation shown in FIGS. 1 to 3, the control valve 1 is sited to one side of the vehicle, and the control spring 8 has a rectilinear inner portion with a cranked outer portion secured to the adjacent link 11. The spring 9 consists of a coil spring having free arms 9A and 9B at opposite ends connected to the adjacent link 11 and coupling member 4, respectively.

Figure 4:
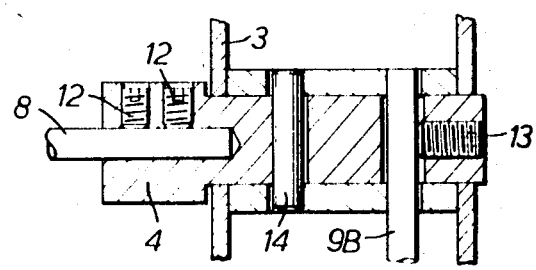

As shown in FIG. 3, the inner end of spring 8 is received in an axial bore in the coupling member 4 and locked in position by two grub screws 12, and the extreme inner end of arm 9B extends through aligned apertures in the member 4 and lever 6, being locked by a grub screw 13. The alternative arrangement shown in FIG. 4 is generally similar, but further comprises a dowel or shear pin 14 to reduce the double shear exerted on the spring arm in transmitting torque from the coupling member 4 to the lever 6.

In operation, upward movement of links 11 deflects the outer ends of spring 8 and 9 upwardly thereby applying to the lever 6 an additional load tending to turn the lever 6 anticlockwise as viewed in FIG. 1. The torque applied to the lever is the sum of the torques applied by the spring 8 and 9.

Figure 5:
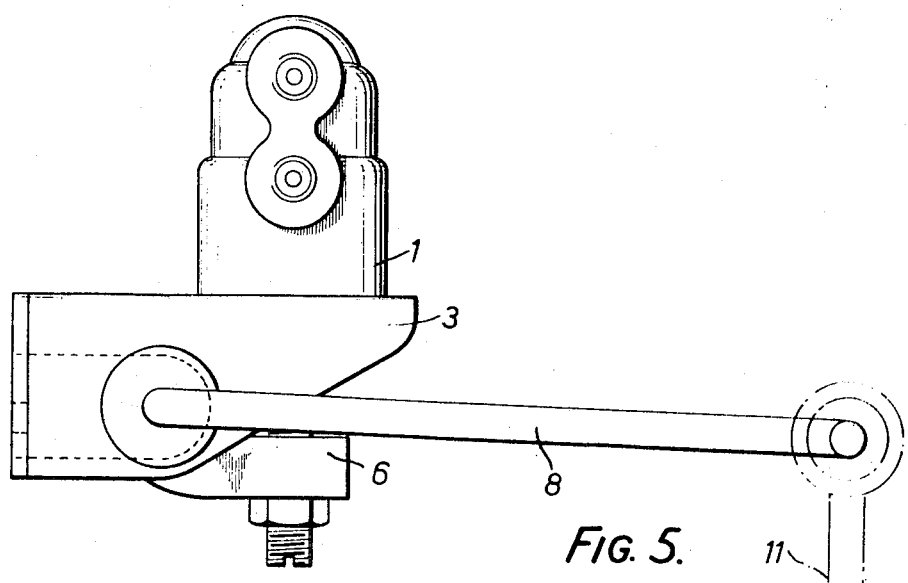
Figure 7:
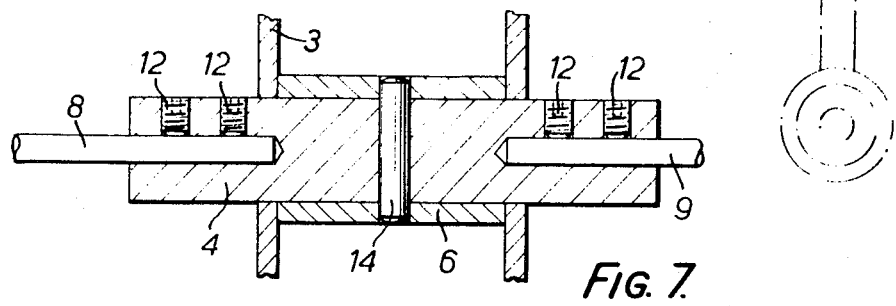

In the installation of FIGS. 5 to 7, the control valve is sited centrally between the wheel assemblies, and the control spring means comprises two equally shaped and dimensioned springs 8 and 9.

Figure 9:
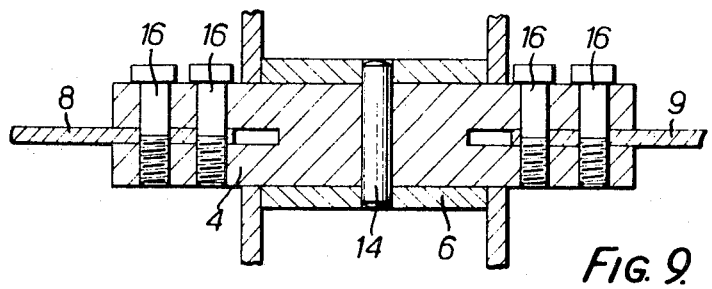

In the case of FIGS. 5 to 7, the control springs are formed of circular cross section wire or rod, but in the installation of FIGS. 8 and 9, the springs are of rectangular cross section. The adjacent inner ends of the springs are received in slots in the coupling member, and secured in position by locking screws 16.

Figure 10:
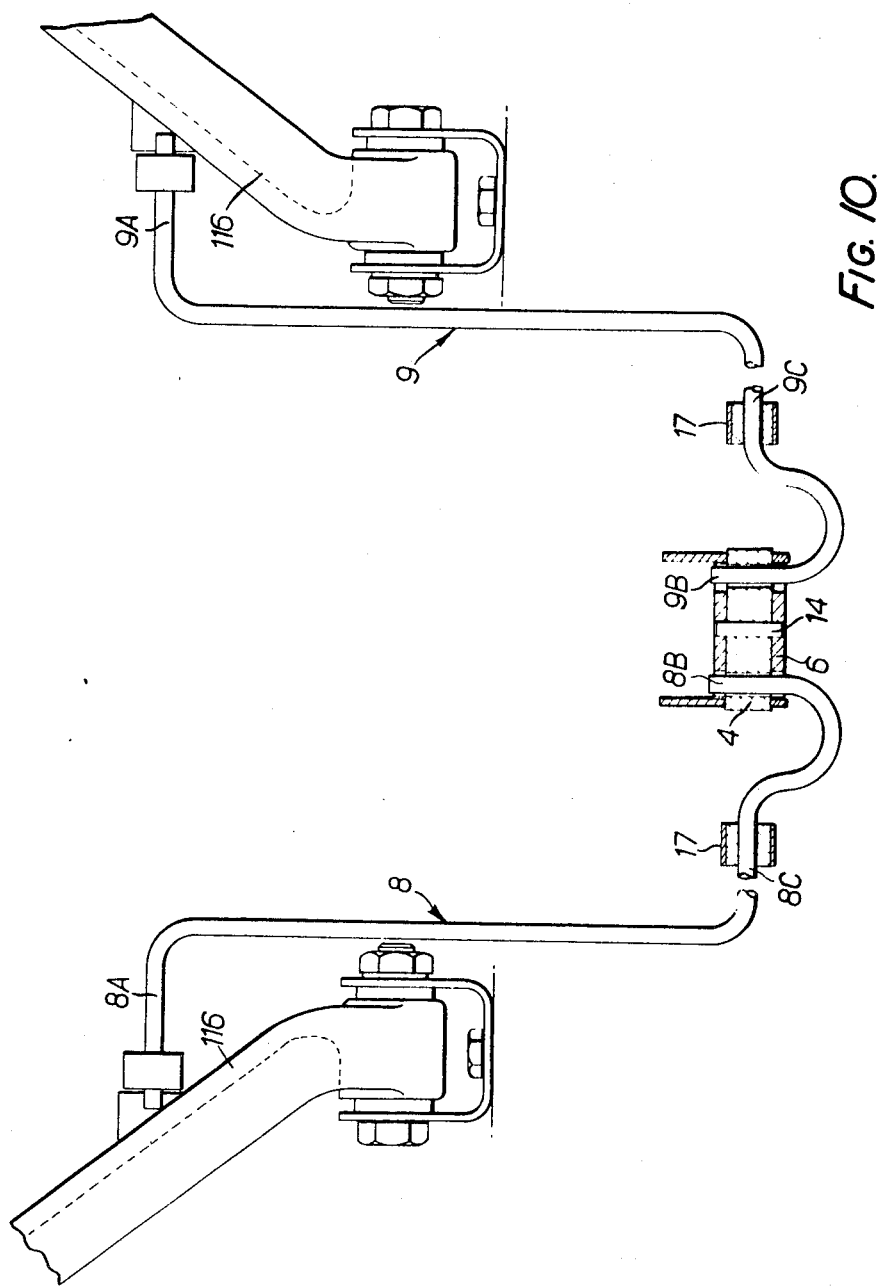
FIG. 10 is a plan view of a fourth form of installation.

In the arrangement shown in FIG. 10, the control valve is again sited centrally of the vehicle, and the control springs are similarly dimensioned and shaped and are arranged symmetrically. Each spring has cranked outer end portions (8A, 9A) which extends parallel with but offset from the axis of rotation of the coupling member 4, and is attached in use to one of the two trailing arms 116 of the rear wheel suspension. An intermediate portion 8C, 9C of each spring is supported in a rotary bearing 17 and the inner end portions 8B, 9B extend radially through holes in coupling member 4 and axial slots in the lever member 6, to transmit spring forces to the members 4 and 6 and effect rotation thereof.

The internal details of the control valve form no part of the present invention, and do not require description. It will, however, be apparent to those skilled in the art that when inserted in the line to the rear wheel brakes, the valve will normally be a pressure-reducing or pressure-limiting valve, or when inserted in the line to the front wheel brakes will usually be a pressure-intensifying valve. The system will normally sense deflection of the rear wheels, but could alternatively sense deflection of the front wheels.

I claim:

1. In or for a motor vehicle having a sprung mass connected to a pair of independently sprung wheel assemblies, each one of said pair being on the opposite side of the vehicle from the other, the improved hydraulic brake pressure control arrangement which comprises a single brake pressure control valve carried by the sprung mass and a control linkage for transmitting to said valve a variable load dependent upon vehicle loading, said control linkage including separate spring members each having a part attached to a respective one of said wheel assemblies, and coupling means including a coupling member journaled for rotation about a fixed axis, said spring members being adapted to transmit to said coupling member forces tending to rotate it, one of said spring members having a coil portion and a free arm at one end thereof, said arm extending radially through said coupling member, and means attaching said free arm to said coupling member.

2. The control arrangement of claim 1, wherein at least one of said control spring members is constituted by a unitary spring member having a rectilinear end portion aligned with and directly coupled to said coupling member.

3. The control arrangement of claim 2, wherein said spring member has a flattened rectangular cross section, and said coupling member has an axially directed slot of rectangular cross section in one end thereof to receive said spring member in a manner preventing relative rotation between said spring member and said coupling member.

4. The control arrangement of claim 1, wherein said control spring members each comprises a unitary spring member having a first outer end portion extending parallel with but offset from the axis of rotation of said coupling member, an intermediate portion extending coaxially with respect to said coupling member, and a second, inner end portion extending radially through said coupling member, the arrangement further comprising bearing means for supporting said intermediate portions of said spring members.